March 10, 1959 R. F. EHAT 2,877,420

MODULATED OSCILLATOR WITH ELIMINATION OF STRAY CAPACITANCE IN SHIELDED INPUT

Filed July 16, 1953

INVENTOR.
Raphael F. Ehat

BY D. C. Snyder
Paul M. Klein Jr.
Attorneys

United States Patent Office 2,877,420
Patented Mar. 10, 1959

2,877,420

MODULATED OSCILLATOR WITH ELIMINATION OF STRAY CAPACITANCE IN SHIELDED INPUT

Raphael F. Ehat, San Francisco, Calif.

Application July 16, 1953, Serial No. 368,541
6 Claims. (Cl. 332—2)
(Granted under Title 35, U. S. Code (1952), sec. 266)

The invention described herein may be manufactured and used by or for the Government of the United States of America for governmental purposes without the payment of any royalties thereon or therefor.

The present invention relates to radio transmitting devices and, more particularly, to an arrangement for detecting and transmitting intelligence received from a transducer such as a mechanically-vibratory, capacity-type pick-up.

Generally speaking, devices of the character described are of a relatively complex and expensive nature if a modulated radio-frequency wave is to be transmitted whose signal-to-noise ratio is sufficiently high to enable optimum reception.

It is an object of the present invention to provide a simple transmitter of the described variety which enables the transmission of modulated waves having a high signal-to-noise ratio and relatively high power considering the size and number of transmitter components.

Other objects and many of the attendant advantages of this invention will be readily appreciated as the same becomes better understood by reference to the following detailed description when considered in connection with the accompanying drawings wherein.

Figure 1:
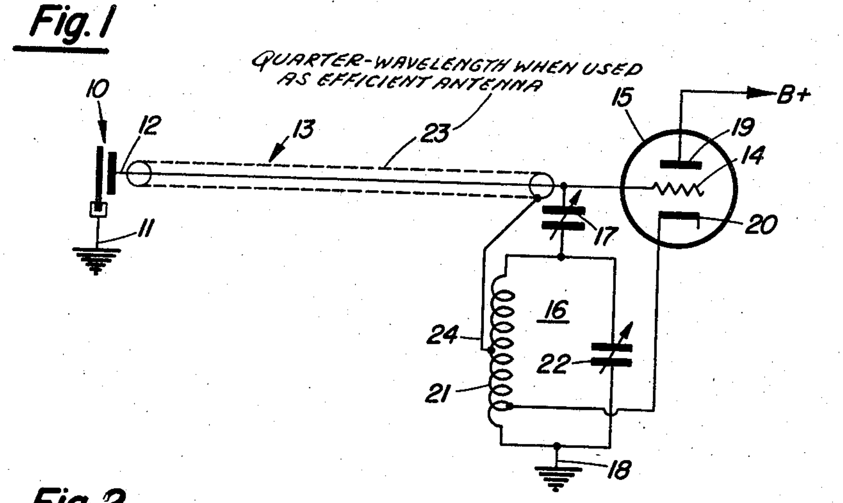
Fig. 1 is a schematic diagram of a simplified embodiment of the invention.

With particular reference to Fig. 1, a transducer of a capacity type which is responsive to pressure or other mechanical force is shown at 10, one of its plates being connected to ground at 11 and the other to a conductor 12 which for reasons discussed hereinafter is the center conductor of a coaxial cable 13. At the other end of the cable 13 this inner conductor 12 is connected to the control grid 14 of a vacuum tube 15 which, in turn, is coupled to the high potential end of the tuned circuit 16 of a "Hartley" oscillator by a variable capacitor 17, the other end of the tuned circuit 16 being connected to ground, as shown at 18. The plate 19 of the tube 15 is connected to a suitable D.-C. source which can comprise an ordinary "B" battery, and the cathode 20 of the tube is connected to the coil 21 of the tank circuit 16 at a position such that weak oscillations can be sustained. The capacitor 22 in the tank 16 is made variable to enable adjustment of the oscillator frequency in the conventional manner.

From the foregoing it will be seen that the variable capacitor 17 and the transducer-capacitor 10 are connected in series between the high potential portion of the tank 16 and ground so that the potential existing upon the grid 14 of the oscillator tube 15 is determined by the voltage-divider action of the two capacitors 10, 17 and variation of either will effect an ampiltude modulation of the oscillator voltage. More specifically, it is seen that any variation in the capacity of the transducer-capacitor 10 due to pressure or other mechanical force will effect the modulation of the oscillator voltage which can be transmitted as conventional radio intelligence.

In practical use of the circuit described the length of the conductor 12 leading from the mechanically-sensitive capacitor 10 to the grid 14 of the oscillator tube 15 is such that, unless precluded in some fashion, it will permit the pick-up of a considerable amount of "noise" signal caused by stray fields, sufficient in fact to mask at least the smaller variations in the mechanically-sensitive capacitor. To avoid the effects of such disturbances the conductor 12 is provided with a shield conveniently constituted by the outer conductor 23 of the coaxial cable 13. While this shield serves to eliminate the effects of stray fields it does, however, interpose in the system additional capacity, namely that between itself and the conductor 12. This would, if not precluded, have the effect of inserting in the line between 10 and 17 a capacity so relatively large as to render substantially undetectable and ineffectual the very changes which are quite small, in the capacity of condenser 10 which it is desired to sense. To reduce to a negligible magnitude the effect of this capacity between the inner conductor 12 and the shield 23 a voltage is applied to the shield 23 which is substantially of equal amplitude and in phase with that existing on the inner conductor 12. This voltage is obtained from a tap 24 located at the proper point on coil 21.

With the outer conductor 23 connected as described it will be apparent that it will serve to radiate the modulated radio frequency of the oscillator and the invention therefore contemplates the use of the shield also as an antenna. When efficiency as an antenna is desired in the illustrated example the shield is made so that its total length is in the neighborhood of one-quarter of a wave length. The invention finds particular usefulness for telemetering when it is desired to convey to a distant point intelligence of an event occurring at a given location and when it is necessary or desirable that the oscillator equipment also be remote from the given location as, for example, in transmitting pressures at the site of an explosion. In such a case the transducer is placed at the given location and the oscillator quite some safe meters away from it and connected to it by a cable conveniently just of an appropriate length for a transmitting antenna.

In the operation of the apparatus of Fig. 1 the variation of the capacity of the mechanically sensitive capacitor 10 is passed to the oscillator protected by the outer conductor or shield portion 23 of the cable 13 so that the amplitude of the oscillator voltage is modulated accurately with respect to the variation of capacity. The shield radiates the modulated signal which can be received in the usual way.

It has been found practical to operate the described arrangement at a radio frequency in the neighborhood of ten megacycles, thereby enabling the use of an antenna (shield) of convenient length. The oscillator frequency is first set by adjustment of the capactor 22 of the tank, subsequent to which the variable capacitor 17 is varied until weak oscillations are maintained. This capacitor can conveniently be of relatively low capacity (e. g. 50 $\mu\mu$f.) as likewise will be the mechanically-sensitive capacitor 10 (1 to 10 $\mu\mu$f.) so that little effect on the oscillator frequency will be offered. It will be apparent that with a different selection of the size of the capacitors 10 and 17, the device can operate on a frequency modulation rather than amplitude modulation basis, but the latter is preferred to produce higher output power.

Figure 2:
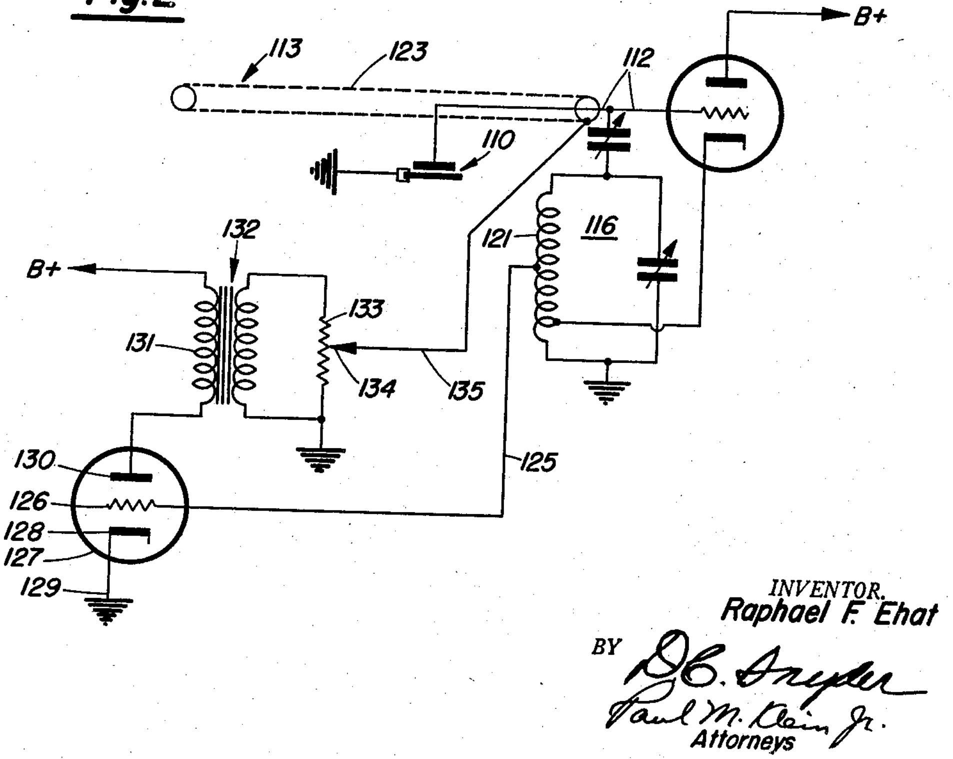
Fig. 2 is a schematic diagram of a modified and somewhat more complex embodiment.

In some cases it has proved impractical to locate a proper tap for connection of the outer conductor or shield 23 of the coaxial cable 13 to the tank coil 21 so that both a sufficiently low impedance path is established between the shield and ground to provide for the removal of "noise" voltage and, at the same time, the proper R. F. voltage magnitude is obtained on the cable shield. To avoid this defect, the modified circuit, as shown in Fig. 2, has been devised. In this modified embodiment the coil 121 of the "Hartley" tank circuit 116 is tapped at a convenient point and the voltage obtained applied through a suitable conductor 125 onto the grid 126 of a second vacuum tube 127 which is arranged as an amplifier. The cathode 128 of the amplifier tube 127 is connected directly to ground as at 129 and its plate 130 to a direct current source through the primary 131 of a transformer 132. The secondary of the transformer 132 is connected across a load resistor 133, one end of which is grounded, and a portion of the voltage, as selected by variable tap 134, is applied to the shield 123 of the coaxial cable 113 by a conductor 135. In this manner a very low impedance to ground can be obtained to remove "noise" voltages from the shield 123 while, at the same time, providing an amplified signal-modulated voltage of correct phase and magnitude to the shield for radiation therefrom. Also, as shown in Fig. 2, the capacity-type transducer can alternatively be connected to the inner conductor 112 of the cable 113 at some intermediate point thereof, a suitable hole being provided in the shield 123 to enable such connection.

Obviously many modifications and variations of the present invention are possible in the light of the above teachings. It is therefore to be understood that within the scope of the appended claims the invention may be practiced otherwise than as specifically described.

What is claimed is:

1. A device of the character described comprising a radio-frequency oscillator including a tank circuit, a variable capacitor, means including a conductor connecting said capacitor to said oscillator so as to effect amplitude modulation of the output of said oscillator, a shield surrounding said conductor, and means connecting said shield to the tank of said oscillator at a point displaced from ground so as to produce a voltage on said shield of substantially equal amplitude and in phase with that on said conductor.

2. A device in accordance with claim 1 wherein said shield is approximately one-quarter of the length of the radio frequency wave.

3. A device of the character described comprising a radio-frequency oscillator including a tank circuit connected to the control grid of a vacuum tube, a conductor connected to the control grid of said tube, a variable capacitor terminating said conductor so as to modulate the output of said oscillator, a shield surrounding said conductor, and means connecting said shield to said tank circuit at a point displaced from ground such that the voltage on said shield is of substantially equal amplitude to and in phase with the voltage on said conductor.

4. A device of the character described comprising a radio-frequency oscillator including a vacuum tube and a tank circuit, a variable capacitor connecting said tank circuit to the control grid of said tube, a second capacitor variable in response to mechanical forces, one plate thereof being grounded, means including a conductor connecting the other plate of said second capacitor directly to said control grid so as to modulate the output of said oscillator, a shield surrounding said conductor, and means connecting said shield to said tank circuit at a point displaced from ground such that the voltage on said shield is of substantially equal amplitude and in phase with the voltage on said conductor.

5. A device according to claim 4 wherein said shield is approximately equal to one-quarter the length of the oscillator output wave.

6. A device according to claim 4 wherein said capacitors are of high impedance at the oscillator frequency.

References Cited in the file of this patent

UNITED STATES PATENTS

| | | |
|---|---|---|
| 2,096,031 | Cork | Oct. 19, 1937 |
| 2,139,055 | Wright et al. | Dec. 6, 1938 |
| 2,152,296 | Weis et al. | Mar. 28, 1939 |
| 2,408,695 | Sinnett et al. | Oct. 1, 1946 |
| 2,443,125 | Weathers | June 8, 1948 |
| 2,548,211 | Frantz | Apr. 10, 1951 |
| 2,623,996 | Gray | Dec. 30, 1952 |
| 2,691,729 | Cornell | Oct. 12, 1954 |